US007075256B2

(12) United States Patent
Murray

(10) Patent No.: US 7,075,256 B2
(45) Date of Patent: Jul. 11, 2006

(54) METHOD AND DEVICE FOR ADJUSTING AN INTERNAL OBSTRUCTION FORCE SETTING FOR A MOTORIZED GARAGE DOOR OPERATOR

(75) Inventor: James S. Murray, Milton, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 0 days.

(21) Appl. No.: 11/063,671

(22) Filed: Feb. 22, 2005

(65) Prior Publication Data

US 2005/0146298 A1 Jul. 7, 2005

Related U.S. Application Data

(63) Continuation of application No. 10/142,642, filed on May 10, 2002, now Pat. No. 6,873,127.

(51) Int. Cl.
*H02P 3/20* (2006.01)

(52) U.S. Cl. ...................... 318/286; 318/283; 318/282; 318/280

(58) Field of Classification Search ................ 318/280, 318/281, 286, 434, 432, 283, 282; 49/26, 49/28
See application file for complete search history.

(56) References Cited

U.S. PATENT DOCUMENTS 4,090,113 A * 5/1978 Ogishi ........................ 318/282
4,212,297 A * 7/1980 Frosch et al. .......... 128/207.14
4,922,168 A * 5/1990 Waggamon et al. ........ 318/286
5,051,672 A * 9/1991 Yaguchi ..................... 318/469
5,166,586 A * 11/1992 Yaguchi ..................... 318/434
5,218,282 A * 6/1993 Duhame ..................... 318/603
5,278,480 A * 1/1994 Murray ....................... 318/626
5,357,183 A * 10/1994 Lin ........................... 318/468
5,412,297 A 5/1995 Clark et al. ................ 318/468
5,419,010 A 5/1995 Mullet ......................... 16/198
5,832,664 A * 11/1998 Tajima et al. .................. 49/26
5,977,732 A * 11/1999 Matsumoto ................. 318/283
6,107,765 A * 8/2000 Fitzgibbon et al. ......... 318/266
6,111,374 A * 8/2000 Fitzgibbon et al. ......... 318/282
6,118,243 A 9/2000 Reed et al. ................. 318/468
6,133,703 A 10/2000 Fitzgibbon et al. ......... 318/445
6,161,438 A * 12/2000 Mullet et al. ................. 73/774
6,451,155 B1 9/2002 Toy et al. ................... 156/325
6,498,450 B1 * 12/2002 Lamm ........................ 318/445
6,633,148 B1 * 10/2003 Klesing ...................... 318/445
6,667,591 B1 * 12/2003 Mullet et al. ............... 318/445
6,710,561 B1 * 3/2004 Dobson ...................... 318/286
6,873,127 B1 * 3/2005 Murray ....................... 318/286
6,879,122 B1 * 4/2005 Stewart et al. ............. 318/280

FOREIGN PATENT DOCUMENTS

EP 0839980 5/1998

* cited by examiner

*Primary Examiner*—Rita Leykin
(74) *Attorney, Agent, or Firm*—Renner Kenner Greive Bobak Taylor & Weber

(57) ABSTRACT

An operator and related method for adjusting an internal force setting for a motorized garage door operator is disclosed. The operator checks for the presence of a secondary entrapment safety feature and automatically increases a force threshold setting from a first value to a second value if the secondary entrapment safety feature is detected. If the safety feature is not detected or it is later disconnected, then the operator automatically sets the force threshold to a more sensitive value.

4 Claims, 3 Drawing Sheets

METHOD AND DEVICE FOR ADJUSTING AN INTERNAL OBSTRUCTION FORCE SETTING FOR A MOTORIZED GARAGE DOOR OPERATOR

CROSS REFERENCE TO RELATED APPLICATION

This is a continuation of patent application Ser. No. 10/142,642, filed May 10, 2002 now U.S. Pat. No. 6,873, 127, entitled "Method and Device for Adjusting an Internal Obstruction Force Setting for a Motorized Garage Door Operator," and which is incorporated herein by reference

TECHNICAL FIELD

Generally, the present invention relates to a garage door operator system for use on a closure member moveable relative to a fixed member. More particularly, the present invention relates to an operator-controlled motor for controlling the operation of a closure member, such as a gate or door, between a closed position and an open position. More specifically, the present invention relates to a door or gate operator, wherein the operator automatically adjusts a force threshold depending upon whether an external secondary entrapment device is connected to the operator.

BACKGROUND ART

For convenience purposes, it is well known to provide garage doors which utilize a motor to provide opening and closing movements of the door. Motors may also be coupled with other types of movable barriers such as gates, windows, retractable overhangs and the like. An operator is employed to control the motor and related functions with respect to the door. The operator receives command signals for the purpose of opening and closing the door from a wireless remote, from a wired wall station or other similar device. It is also known to provide safety devices that are connected to the operator for the purpose of detecting an obstruction so that the operator may then take corrective action with the motor to avoid entrapment of the obstruction.

Safety devices come in many forms for use with a garage door operator. One of the more widely used devices is a photoelectric eye which projects a light beam across the door's travel path. If the light beam is interrupted during closure of the door, the operator stops and/or stops and reverses the travel of the door. This is sometimes referred to as a non-contacting or an external secondary entrapment device. Contact type safety devices such as an edge-sensitive pressure switch, which is attached to the bottom edge of the door and runs the complete width of the door, may also be used. Other contact safety devices directly monitor the operating characteristics of the driving motor to determine whether an obstruction is present. Typically, shaft speed of the motor is monitored by projecting an infrared light through an interrupter wheel. Alternatively, Hall effect switches or tachometers can be used to monitor shaft speed. Or, the motor current could be monitored such that when an excessive amount of current is drawn by the motor—which indicates that the motor is working harder than normal—it is presumed that an obstruction has been encountered. It is also known to monitor door speed with a sliding potentiometer, wherein a rate of change is equated to the speed of the door and wherein unexpected slowing of the door triggers corrective action by the operator. Regardless of how the safety devices work, their purpose is to ensure that individuals, especially children, are not entrapped by a closing door. Opening forces of the door are also monitored to preclude damage to the operating system for instances where an object or individual is caught upon a door panel as the door moves upwardly.

How safety devices are used with a door operator system have evolved from the days of no uniform standard to the currently applied government regulations as embodied in Underwriters Laboratories Standard 325. The standard requires that when an operator is mounted to a pinch-resistant door and an external secondary entrapment device is not connected to the operator, that a fifteen pound obstruction force threshold setting must be used. In other words, if no external secondary entrapment device is attached to the operator then the maximum force that the motor is allowed to apply to the door—in a closing direction—is fifteen pounds. But, if an external secondary entrapment device is attached, then the UL standard does not require a maximum obstruction force setting.

If the end-user selects an operator model without the external secondary entrapment feature, then an input jumper switch is set to disable and the fifteen pound force threshold is used during barrier movement. If the end-user selects an operator model with the external secondary entrapment feature, then the input jumper is permanently enabled and the force threshold value is set at a higher value, typically twenty-five pounds. If the end-user desires to later add the external secondary entrapment feature, then the jumper must be physically moved from a disabled position to an enabled position. If the jumper is not moved to an enabled position then the external secondary entrapment feature will work, but the force threshold remains at fifteen pounds. It has been found that the fifteen pound threshold is quite sensitive and as a result phantom obstructions are encountered. In other words, the operator falsely detects and reacts to a non-existent obstruction in the barrier's path. Such false detections may be the result of the wind, temperature, debris in the door track and the like. These false detections cause the barrier to reverse direction and require the user to wait unnecessarily for the barrier to complete its opening or closing cycle. In any event, there is a need in the art to simplify the later installation of a secondary entrapment feature to an existing operator.

DISCLOSURE OF INVENTION

It is thus an object of the present invention to provide a method and device for adjusting an internal obstruction force setting for a motorized garage door operator.

In general, the present invention contemplates a method for adjusting an internal force setting for a motorized garage door operator comprising checking for the presence of an external secondary entrapment safety feature and increasing a force threshold setting from a first value to a second value if the external secondary entrapment safety feature is detected.

The invention contemplates a method for adjusting an internal force setting for a motorized garage door operator, comprising checking for the presence of an external secondary entrapment safety feature, and decreasing a force threshold setting from a first value to a second value if the external secondary entrapment safety feature is not detected.

The invention further contemplates an operator system for controlling the operation of a movable barrier comprising a motor for moving the barrier between open and closed positions, an operator for controlling the operation of said motor so that said motor applies a force within a threshold of force value, and a controller carried by said operator for detecting the presence of an external safety device and adjusting said threshold of force value accordingly.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
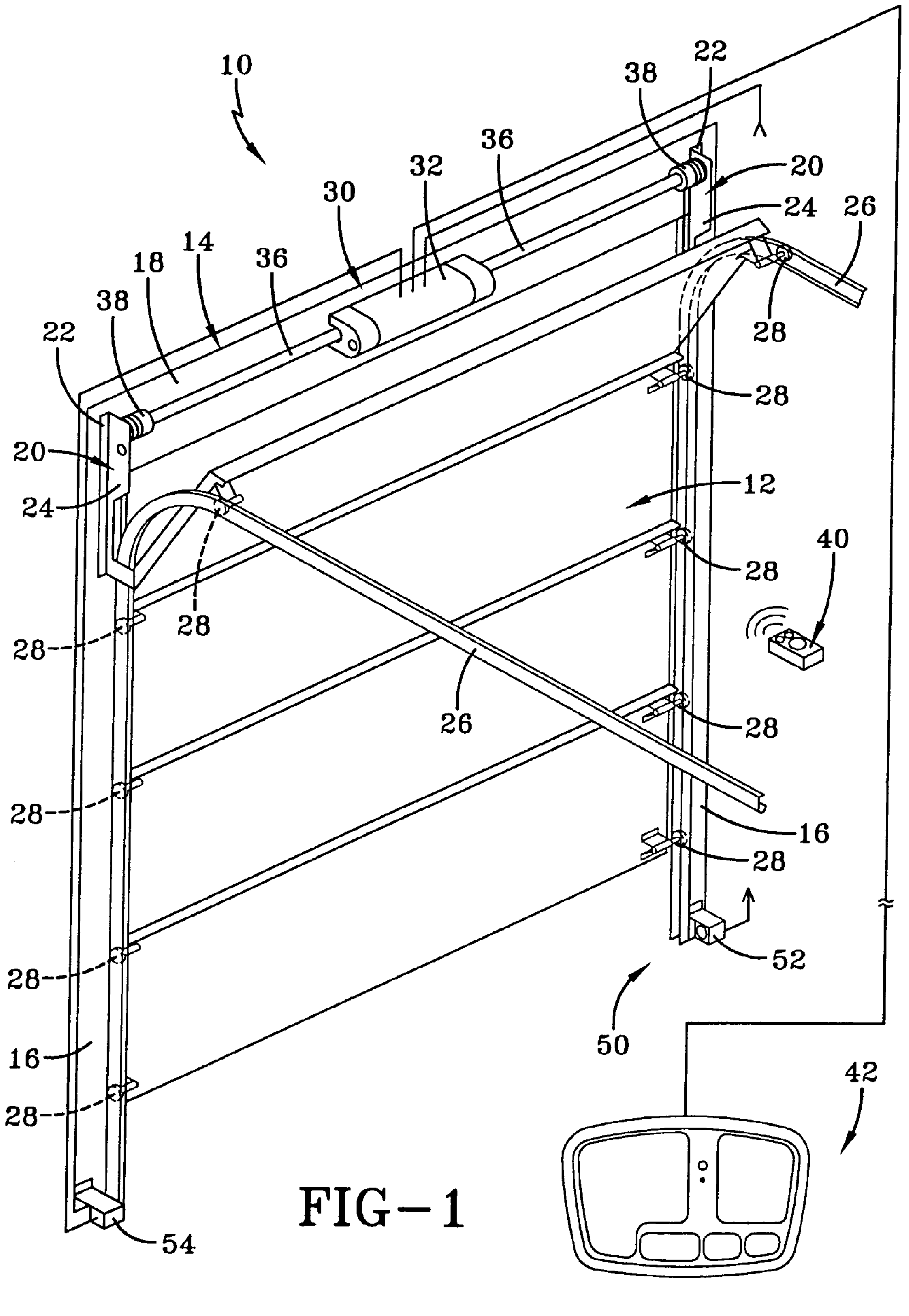
FIG. 1 is a fragmentary perspective view depicting a sectional garage door and showing an operating mechanism embodying the concepts of the present invention.

A system and related method for adjusting an internal obstruction force setting for a motorized garage door operator is generally indicated by the numeral 10 in FIG. 1 of the drawings. The system 10 is employed in conjunction with a conventional sectional garage door generally indicated by the numeral 12. The door 12 is most likely an anti-pinch type door. The opening in which the door is positioned for opening and closing movements relative thereto is surrounded by a frame, generally indicated by the numeral 14, which consists of a pair of a vertically spaced jamb members 16 that, as seen in FIG. 1, are generally parallel and extend vertically upwardly from the ground (not shown). The jambs 16 are spaced and joined at their vertically upper extremity by a header 18 to thereby form a generally u-shaped frame 14 around the opening for the door 12. The frame 14 is normally constructed of lumber or other structural building materials for the purpose of reinforcement and to facilitate the attachment of elements supporting and controlling the door 12.

Secured to the jambs 16 are L-shaped vertical members 20 which have a leg 22 attached to the jambs 16 and a projecting leg 24 which perpendicularly extends from respective legs 22. The L-shaped vertical members 20 may also be provided in other shapes depending upon the particular frame and garage door with which it is associated. Secured to each projecting leg 24 is a track 26 which extends perpendicularly from each projecting leg 24. Each track 26 receives a roller 28 which extends from the top edge of the garage door 12. Additional rollers 28 may also be provided on each top vertical edge of each section of the garage door to facilitate transfer between opening and closing positions.

Figure 2:
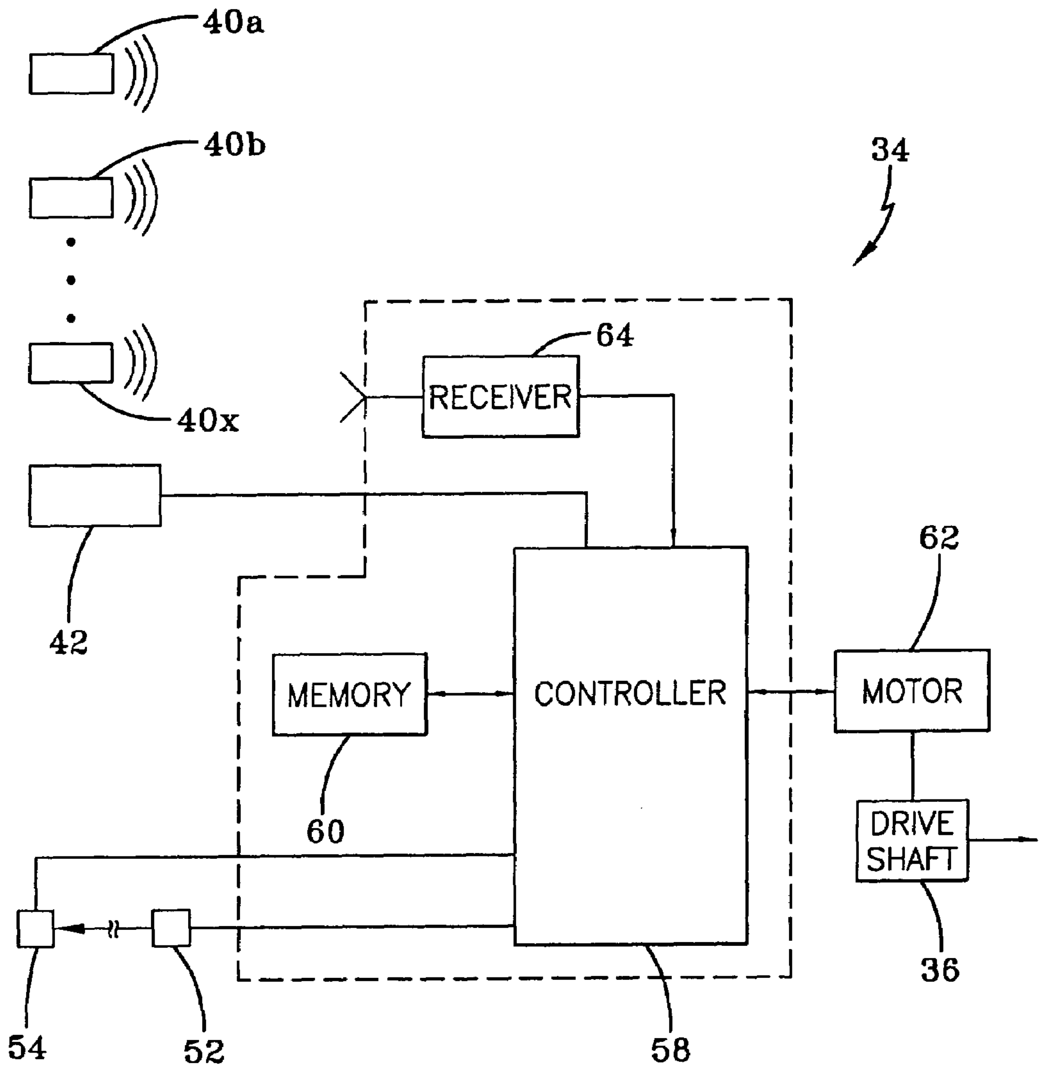
FIG. 2 is a schematic diagram of an operator mechanism.

A counterbalancing system generally indicated by the numeral 30 may be employed to move the garage door 12 back and forth between opening and closing positions. One example of a counterbalancing system is disclosed in U.S. Pat. No. 5,419,010, which is incorporated herein by reference. Generally, the counter-balancing system 30 includes a housing 32, which is affixed to the header 18 which contains an operator mechanism generally indicated by the numeral 34 as seen in FIG. 2. Extending from each end of the operator mechanism 34 is a drive shaft 36, the opposite ends of which are received by tensioning assemblies 38 that are affixed to respective projecting legs 24. Carried within the drive shaft 36 are counterbalance springs as described in the '010 patent. Although a header-mounted operator is specifically discussed herein, the control features to be discussed later are equally applicable to other types of operators used with movable barriers. The teachings of the present invention are equally applicable to other types of movable barriers such as single panel doors, gates, windows, retractable overhangs, and any device that at least partially encloses an area.

In order to move the door from an open position to a closed position or vice versa, a remote transmitter 40 or a wall station transmitter 42 may be actuated. The remote transmitter 40 may use infrared, acoustic or radio frequency signals that are received by the operator mechanism to initiate movement of the door. Likewise, the wall station 42 may perform the same functions as the remote transmitter 40 and also provide additional functions such as the illumination of lights and provide other programming functions to control the manner in which the garage door works. The wall station 42 may either be connected directly to the operator mechanism 34 by a wire or it may employ radio frequency or infrared signals.

An external secondary entrapment system, which is designated generally by the numeral 50, may be included with the system 10. In the preferred embodiment, the entrapment system 50 is a photoelectric sensor which has a sending device 52 and a receiving device 54. The sending device 52 is mounted to either the jamb 16 or the track 26 near the floor of the door area. The devices 52 and 54 are mounted at about 5 inches above the floor and on the inside of the door opening to minimize any interference by the sun. It will be appreciated that the position of the devices 52 and 54 may be switched if needed. In any event, the sending device 52 emits a light beam, either laser or infrared, that is detected by the receiver 54 which is connected to the operator mechanism 34. If an object interrupts the light beam during door travel, the receiver relays this information to the controller which initiates the appropriate corrective action. In this way, if an object interrupts a light beam during a downward motion of the garage door the motion of the door is at least stopped and/or returned to the opening position. It will be appreciated that other external secondary entrapment features or systems such as a contact-type safety edge on the bottom panel of the door, motor speed detectors, shaft speed detectors, motor current detectors, door speed monitors or the like may be used with the present invention.

Referring now to FIG. 2, it can be seen that the operator mechanism employs a controller 58 which receives power from batteries or some other appropriate power supply. The controller 58 includes the necessary hardware, software, and a memory device 60 to implement operation of the operator 34. When either a remote transmitter 40 or wall station 42 is actuated, a receiver 64 receives the signal and converts it into a form useable by the controller 58. If a valid signal is received by the controller 58, it initiates movement of the motor 62 which, in turn, generates rotatable movement of the drive shaft 36 and the door is driven in the appropriate direction. The external secondary entrapment system 50, particularly the sending and receiving units 52, 54, are also connected to the controller 58 to provide appropriate input.

Figure 3:
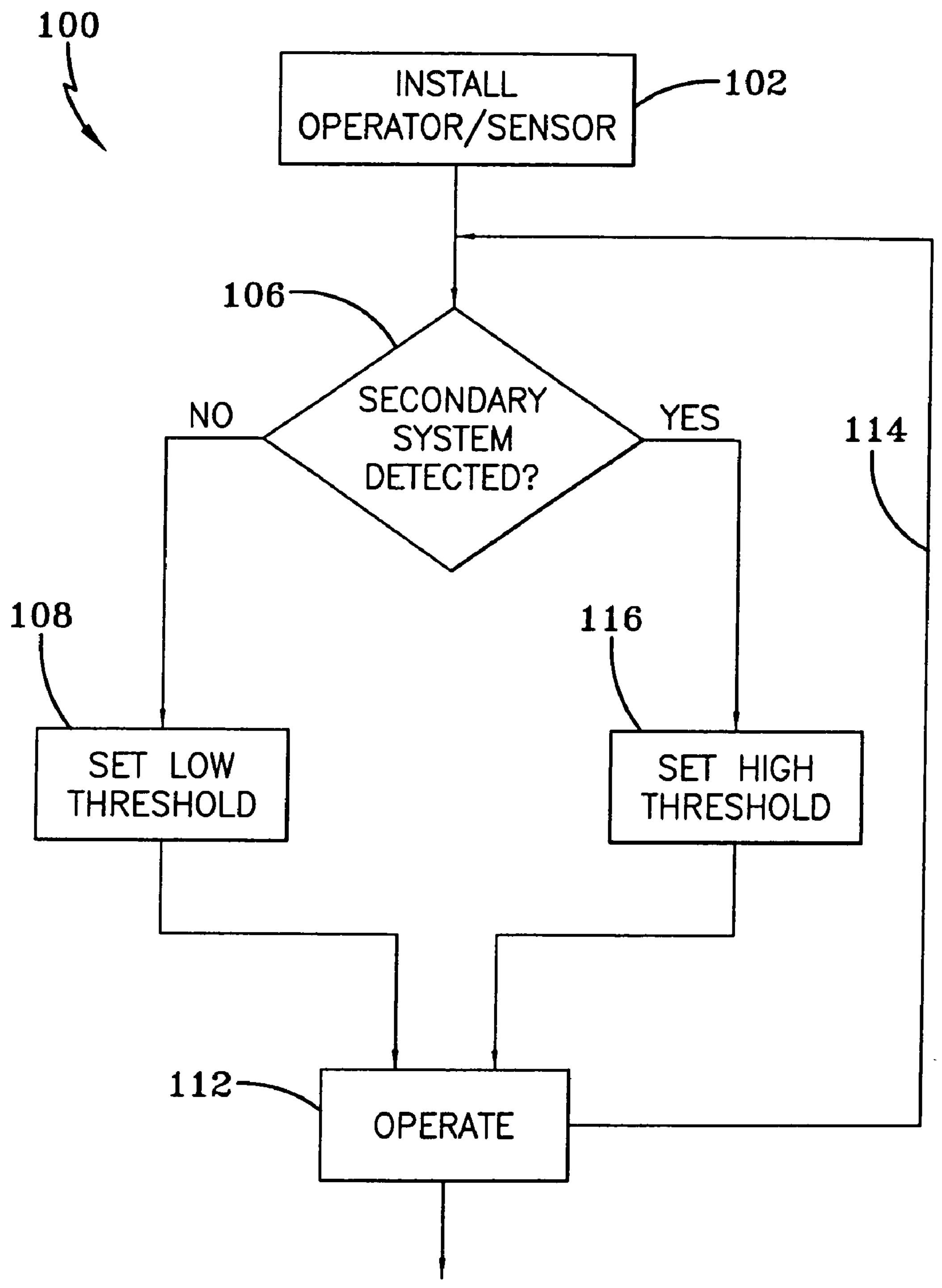
FIG. 3 is an operational flow chart employed by operator of the present invention for adjusting the force setting.

Referring now to FIG. 3, a flow chart, designated generally by the numeral 100 is representative of the software embodied and contained within the controller for controlling operation of the operator. At step 102, the operator is installed and if desired, the external secondary entrapment system is also installed. As noted previously, the external secondary entrapment system 50 is not required for operation of the operator 34. And, if the operator is installed without the external secondary entrapment system, the controller 58 limits the power applied to the motor 62 to a threshold of about fifteen pounds. In other words, the controller with the use of various force sensors and the like, is able to determine the amount of force applied by the motor at any instant during travel of the door from an open position to a closed position or vice versa. From this base line application of force, the controller knows to allow application of fifteen pounds more or fifteen pounds less to the base line force profile. Accordingly, if an obstruction is detected which is greater than fifteen pounds or less than fifteen pounds from the force profile, the controller 58 takes the appropriate corrective action.

At step 106, the controller 58 determines whether an external secondary entrapment system such as the photoelectric sensor 50 has been attached to the operator mechanism 34. If not, then at step 108, the lower threshold value, which in the preferred embodiment is fifteen pounds, is set and implemented. Accordingly, at step 112, the system is operational and the appropriate functions are performed. It will be appreciated that at step 112 the controller 58 monitors to determine whether the external secondary system is still connected to the operator by returning to the decision step 106. If at step 106 the controller determines that the external secondary entrapment system is connected, then at step 116 a higher threshold level is set which, in the preferred embodiment is twenty-five pounds. In other words, the motor is allowed to deviate twenty-five pounds plus or minus from the operational force profile set by the controller 58. Once this higher threshold is set, then at step 112 the controller proceeds with its normal operation. The methodology then returns to step 106 to check to ensure that the external secondary entrapment system is still attached. If, for some reason, the sensor is rendered inoperative and not detected, then the lower force threshold profile is used.

From the description above, it will be appreciated that an operator system may be used which allows the force threshold setting to be automatically changed, depending upon the type of external secondary entrapment systems associated with the operator. If an external secondary entrapment feature is not attached to the operator, then a minimal force threshold is set and provides the most sensitivity for detecting obstructions that impede with travel of the door. And the system also provides that if an external secondary entrapment system is attached to the operator then the threshold can be set at a higher level to reduce the occurrence of phantom detections. By automatically detecting the presence or absence of the external secondary entrapment system, the user is not physically required to move a jumper or attach a jumper when installing the safety feature. This avoids aggravation on the part of the installer when installing the entrapment system and on the part of the user for eliminating false detections of obstructions.

Thus, it should be evident that the method and device for increasing the allowed motor power of a motorized garage door operator disclosed herein carries out the various objects of the present invention set forth above and otherwise constitutes an advantageous contribution to the art. As will be apparent to persons skilled in the art, modifications can be made to the preferred embodiments disclosed herein without departing from the spirit of the invention. Therefore, the scope of the invention herein described shall be limited solely by the scope of the attached claims.

What is claimed is:

1. A method for adjusting an internal force threshold setting for a motorized garage door operator actuated in response to a door move command, the method comprising:

establishing a base line force application value applied by a motor to move a door between limit positions;

storing in a controller maintained by the garage door operator said base line force application value;

periodically checking for connection of any one of a plurality of entrapment safety features to said controller by said controller, said controller setting a force threshold to a default value if none of said entrapment safety features are connected to said controller and increasing said force threshold value a predetermined amount above said default value if at least one of said entrapment safety features are connected to said controller, wherein said periodic checking step is performed regardless of whether the door move command has been received or not;

determining by the controller the amount of force applied by the motor during movement of the door; and implementing corrective action by said controller if the amount of force actually applied by the motor is greater or less than said base line force application value and said force threshold value.

2. The method according to claim 1, further comprising:

setting said threshold to said default value in said controller if none of said entrapment safety features are connected to said controller.

3. The method according to claim 2, further comprising:

selecting said entrapment safety features from a group consisting of photoelectric sensors, contact-type safety edge, a motor speed detector, a motor current detector and a door speed monitor.

4. An operator system for controlling the operation of a movable barrier, comprising:

a motor that applies force to move the barrier between open and closed positions in response to a door move command;

at least one force sensor associated with said motor for determining a base line application of force applied by said motor to the barrier;

a controller connected to said motor to control operation of said motor and to said at least one force sensor, said controller monitoring the force applied by said motor as detected by said at least one force sensor and allowing only said base line application of force and a threshold value to be applied by said motor to the barrier, said controller initiating corrective action through said motor if said base line application of force and said threshold value is exceeded as detected by said at least one force sensor;

said controller periodically checking for the connection of at least one safety device to said controller, wherein the connection is checked regardless of whether said door move command has been received or not, and increasing said threshold value a predetermined amount if at least one said safety device is connected and maintaining said threshold value if none of said safety devices are connected.

* * * * *